(12) United States Patent
Kitayama et al.

(10) Patent No.: US 9,821,870 B2
(45) Date of Patent: Nov. 21, 2017

(54) REAR CARRIER FOR SADDLE-RIDE VEHICLE

(71) Applicant: HONDA MOTOR CO., LTD., Minato-Ku, Tokyo (JP)

(72) Inventors: Kyosuke Kitayama, Wako (JP); Kenji Tako, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 173 days.

(21) Appl. No.: 14/805,559

(22) Filed: Jul. 22, 2015

(65) Prior Publication Data
US 2016/0023704 A1   Jan. 28, 2016

(30) Foreign Application Priority Data

Jul. 25, 2014   (JP) .................................. 2014-151784

(51) Int. Cl.
*B62J 9/00*   (2006.01)

(52) U.S. Cl.
CPC ................. *B62J 9/001* (2013.01); *B62J 9/00* (2013.01)

(58) Field of Classification Search
CPC ..... B62J 9/001; B62J 11/00; B62J 7/04; B62J 9/00; B60R 9/06
USPC ................................ 224/433, 446, 501, 552
See application file for complete search history.

(56) References Cited

U.S. PATENT DOCUMENTS

| | | | | |
|---|---|---|---|---|
| 5,127,562 A * | 7/1992 | Zane | ....................... | B62J 11/00 224/413 |
| 5,735,441 A * | 4/1998 | Fujimoto | ................. | B62J 11/00 224/420 |
| 7,503,573 B2 * | 3/2009 | Finlaw | ..................... | B62J 11/00 224/412 |
| 8,365,969 B2 * | 2/2013 | Johnson | .................... | B60R 9/08 190/14 |
| 8,596,506 B2 * | 12/2013 | Yu | ............................ | B62H 5/00 224/419 |
| 2008/0073396 A1 * | 3/2008 | Chiang | .................... | B62J 9/001 224/413 |

FOREIGN PATENT DOCUMENTS

JP   2002-255073 A   9/2002

* cited by examiner

*Primary Examiner* — Adam Waggenspack
(74) *Attorney, Agent, or Firm* — Carrier Blackman & Associates, P.C.; William D. Blackman; Joseph P. Carrier

(57) ABSTRACT

A rear carrier is provided with a base panel that is provided on a side of a vehicle body, and a top panel that is positioned on an upper part of the base panel. The top panel is composed of a fixed top panel that is provided to the base panel, and a movable top panel that is configured to be slidable to a rear side with respect to the base panel by slide mechanisms. Respective upper surfaces of the fixed top panel and the movable top panel are positioned on the same plane. Top box support parts for supporting a top box are provided to exposed parts that are provided to the base panel and/or the top panel in order to be exposed by sliding the movable top panel.

14 Claims, 12 Drawing Sheets

FIG. 2A
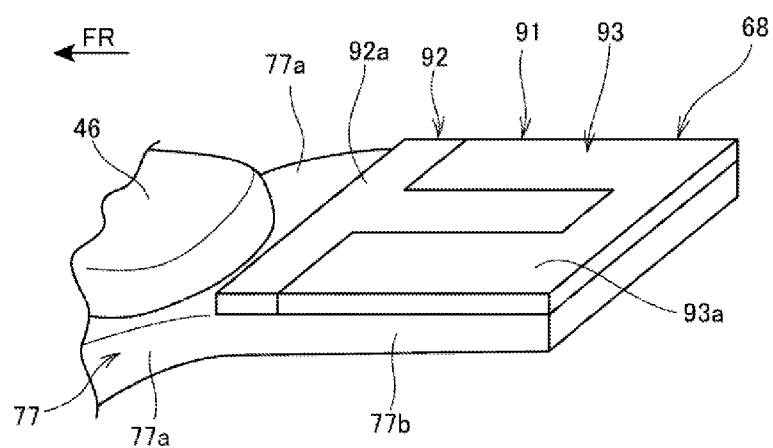
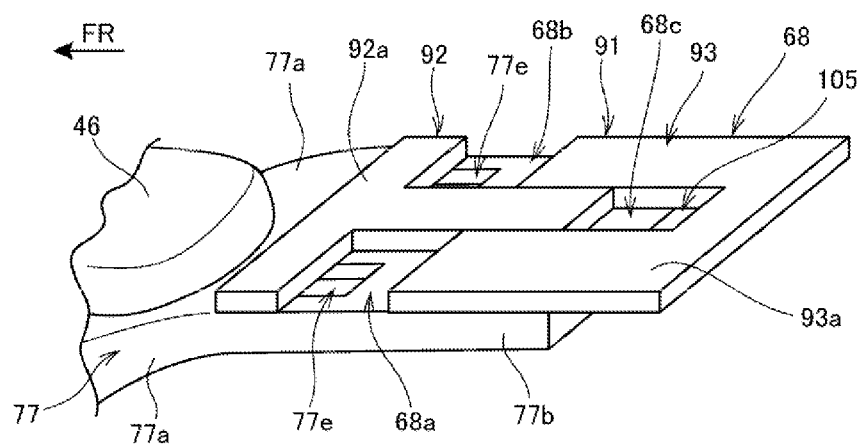
FIG. 2B

FIG. 6A
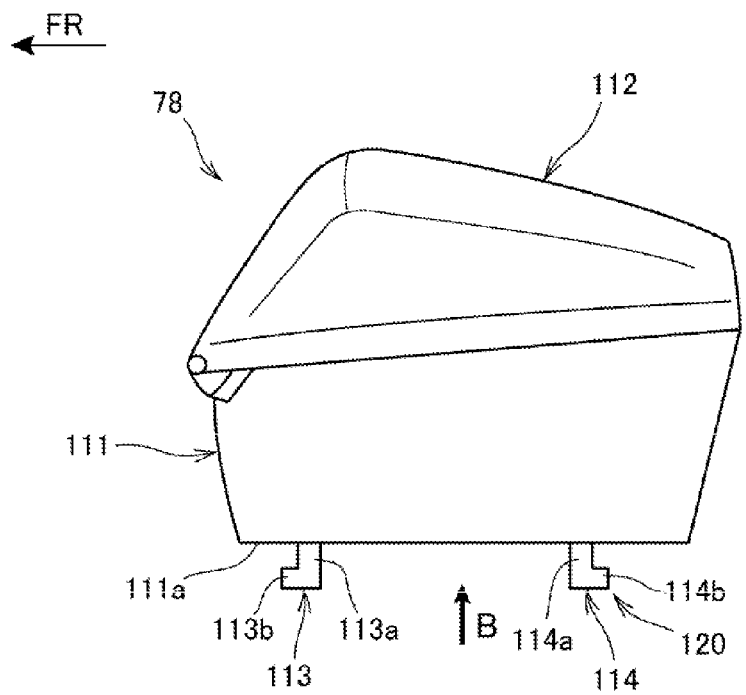
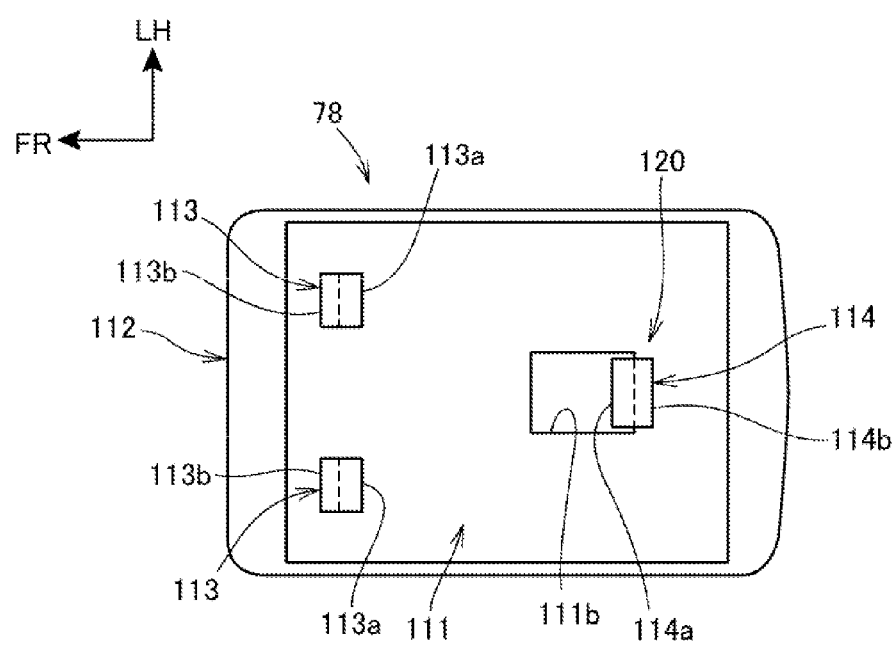
FIG. 6B

FIG. 10 A
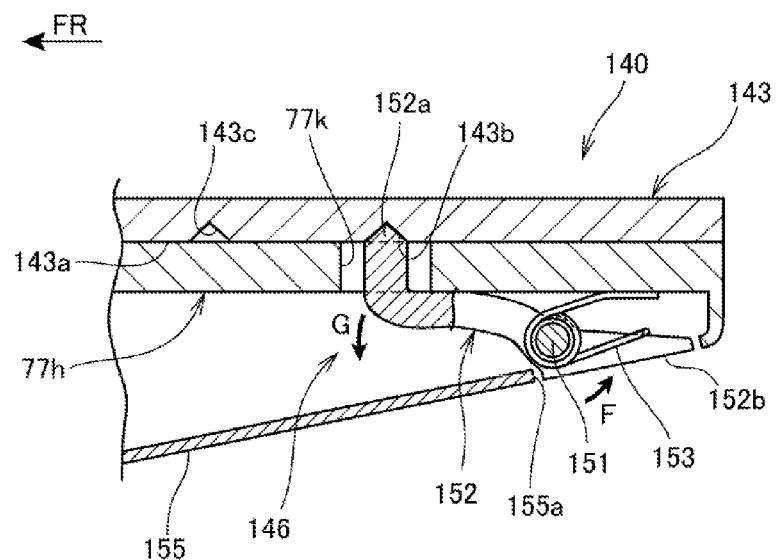
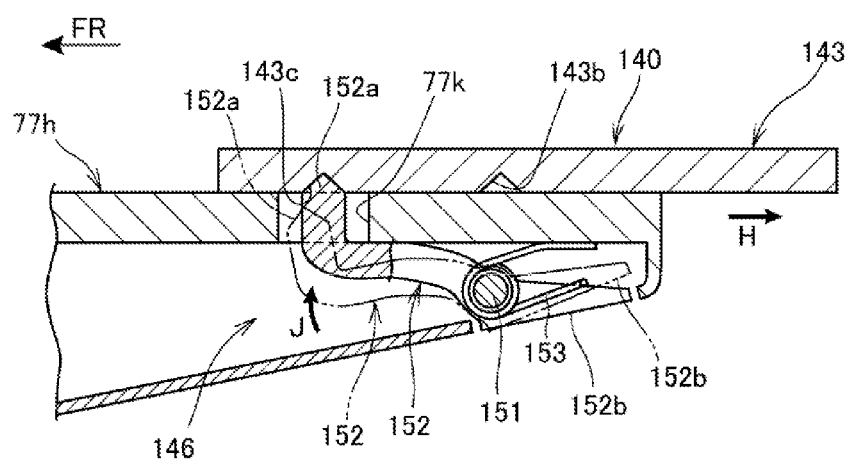
FIG. 10B

REAR CARRIER FOR SADDLE-RIDE VEHICLE

CROSS-REFERENCE TO RELATED APPLICATIONS

The present disclosure claims priority under 35 USC 119 based on Japanese Patent Application No. 2014-151784, filed on Jul. 25, 2014. The entire subject matter of this priority document, including specification claims and drawings thereof, is incorporated by reference herein.

BACKGROUND

A rear carrier for a saddle-ride type vehicle, that is provided behind a seat in order to support a load, such as a baggage carrier, a cargo box or a top box for storing the baggage, is disclosed herein.

JP-A No. 2002-255073 discloses an existing rear carrier for a saddle-ride type vehicle that includes a slide mechanism for enlarging a placing surface for the rear carrier in a vehicle width direction. The slide mechanism in JP-A No. 2002-255073 has a structure configured such that an auxiliary carrier disposed below the placing surface of the rear carrier is taken in and out in the vehicle width direction. As a result, there is a difference in height between the placing surface and an upper surface of the auxiliary carrier such that it is difficult to dispersively receive a load of a bulky baggage.

Also, when a top box is supported by the rear carrier, a separately exclusive support part has to be provided. For this reason, in the saddle-ride type vehicle with limited space, when the top box is not mounted, the support part is exposed to the outside. As a result, it is difficult to support the top box while maintaining a quality appearance.

Accordingly, there is room in the art for a rear carrier structure that can stably accommodate bulky baggage or the like while maintaining a quality appearance.

SUMMARY

The disclosed rear carrier has been achieved in view of the above-mentioned circumstances. An object of the present disclosure is to provide a rear carrier for a saddle-ride type vehicle configured in such a manner that a bulky baggage, a top box, or the like can be stably loaded while maintaining a quality appearance.

In order to achieve the above-mentioned object, a rear carrier for a saddle-ride type vehicle includes a slide mechanism that is positioned behind a seat and that is configured to enlarge and/or contract a placing surface. In the rear carrier for the saddle-ride type vehicle, the rear carrier is provided with a base panel that is provided on a side of a vehicle body, and a top panel that is positioned on an upper part of the base panel, the top panel is composed of a fixed top panel that is provided to the base panel, and a movable top panel that is configured to be slidable to the rear with respect to the base panel by the slide mechanism, respective upper surfaces of the fixed top panel and the movable top panel are positioned on the same plane, and a top box support part for supporting a top box is provided to an exposed part that is provided to the base panel and/or the top panel in order to be exposed by sliding the movable top panel.

In the above-described structure, the fixed top panel may be formed into a T shape in a planar view, the movable top panel may be formed into a U shape in the planar view in order to be fitted around the T shape, and the top panel may take a form of a substantially rectangular shape in the planar view when mounting the top box.

Also, in the above-described structure, the fixed top panel may be composed of a crosswise extension part that extends in a vehicle width direction and a longitudinal extension part that extends rearward from the crosswise extension part. A pair of right and left front openings that are located immediately behind the crosswise extension part and that are formed in the base panel across the longitudinal extension part, and a rear opening that is formed of the base panel and the movable top panel, may appear in the exposed part when the movable top panel is slid rearward. The top box support part may be formed of each of edges of the front openings and the rear opening.

Also, in the above-described structure, the top box may be provided with a pair of right and left front locking claws and a rear locking claw that are provided in positions corresponding to the front openings and the rear opening. The front locking claws may be fixed. The rear locking claw may be formed to be movable according to a position of a lever. The rear locking claw may be locked when the lever is stored. The rear locking claw may be unlocked when the lever is released.

Also, in the above-described structure, the top box may be provided with a pair of right and left front locking claws and a rear locking claw that are provided in positions corresponding to the front openings and the rear opening. The front locking claws and the rear locking claw may be fixed. A locking member that is urged by an elastic member provided to the base panel may be fitted into a recessed part formed in the movable top panel in such a manner that the movable top panel is moved to a backmost side, the front locking claws and the rear locking claw are inserted into the front openings and the rear opening, and after that, the movable top panel is moved forward.

Also, in the above-described structure, the slide mechanism may be a projecting rail, a recessed groove, or an oblong hole that is formed with respect to the base panel, and may be a mechanism configured to be fitted into or around a recessed part or a projecting part that is formed with respect to the movable top panel.

Also, in the above-described structure, the slide mechanism may be a mechanism configured in such a manner that the projecting part projecting from the movable top panel is fitted into the oblong hole formed in the base panel, and a coming-off preventing member is provided for preventing the projecting part from coming off from the oblong hole.

Also, in the above-described structure, the fixed top panel may be integrally formed with both or one of a rear grip provided to the vehicle and the base panel.

In the present disclosure, a rear carrier is provided with a base panel that is provided on a side of a vehicle body, and a top panel that is positioned on an upper part of the base panel. The top panel is composed of a fixed top panel that is provided to the base panel, and a movable top panel that is configured to be slidable to the rear with respect to the base panel by a slide mechanism. Respective upper surfaces of the fixed top panel and the movable top panel are positioned on the same plane. A top box support part for supporting a top box is provided to an exposed part that is provided to the base panel and/or the top panel in order to be exposed by sliding the movable top panel. With this arrangement, the top panel is divided into the fixed top panel and the movable top panel, and the upper surfaces of the fixed top panel and the movable top panel are positioned on the same plane. For this reason, a bulky baggage can be stably placed. Also, since the top box support part is provided to the exposed part that is exposed by sliding the movable top panel, the top box support part can be prevented from being exposed when the top box is not mounted. As a result, appearance quality can be secured. Also, when the top box is mounted, after creating such a state that the placing surface is necessarily enlarged and the load can be stably received, the top box can be arranged.

Also, the fixed top panel is formed into a T shape in a planar view, the movable top panel is formed into a U shape in the planar view in order to be fitted around the T shape, and the top panel takes a form of a substantially rectangular shape in the planar view when mounting the top box. With this arrangement, the fixed top panel and the movable top panel are excellently combined with each other, and the top panel is formed into the substantially rectangular shape in the planar view when the top box is mounted. For this reason, the appearance quality can be secured.

Also, the fixed top panel is composed of a crosswise extension part that extends in a vehicle width direction and a longitudinal extension part that extends rearward from the crosswise extension part. A pair of right and left front openings that are located immediately behind the crosswise extension part and that are formed in the base panel across the longitudinal extension part, and a rear opening that is formed of the base panel and the movable top panel, appear in the exposed part when the movable top panel is slid rearward. The top box support part is formed of each of edges of the front openings and the rear opening. With this arrangement, the movable top panel having a channel shape or the U shape in the planar view is only slid rearward, so that the edge parts of the openings for supporting the top box at two front points and one rear point appear, and the top box can be stably supported at three points. Also, since a position of the rear one point can be adjusted by sliding, a plurality of top boxes having claws capable of being engaged with the openings and having different capacity can be supported in optional positions.

Also, the top box is provided with a pair of right and left front locking claws and a rear locking claw that are provided in positions corresponding to the front openings and the rear opening. The front locking claws are fixed. The rear locking claw is formed to be movable according to a position of a lever. The rear locking claw is locked when the lever is stored. The rear locking claw is unlocked when the lever is released. With this arrangement, by the state of the lever, it is easy to confirm whether or not the top box is locked.

Also, the top box is provided with a pair of right and left front locking claws and a rear locking claw that are provided in positions corresponding to the front openings and the rear opening. The front locking claws and the rear locking claw are fixed. A locking member that is urged by an elastic member provided to the base panel is fitted into a recessed part formed in the movable top panel in such a manner that the movable top panel is moved to a backmost side, the front locking claws and the rear locking claw are inserted into the front openings and the rear opening, and after that, the movable top panel is moved forward. With this arrangement, the movable top panel can be slidably locked by such a simple operation that the movable top panel is moved to the backmost side, the front locking claws and the rear locking claw of the top box are inserted, and the movable top panel is moved forward. Also, the movable top panel can be unlocked by such a simple operation that the urging of the elastic member is canceled and the movable top panel is pulled rearward.

Also, the slide mechanism is a projecting rail, a recessed groove, or an oblong hole that is formed with respect to the base panel, and is a mechanism configured to be fitted into or around a recessed part or a projecting part that is formed with respect to the movable top panel. With this arrangement, easy assembly can be achieved.

Also, the slide mechanism is a mechanism configured in such a manner that the projecting part projecting from the movable top panel is fitted into the oblong hole formed in the base panel, and a coming-off preventing member is provided for preventing the projecting part from coming off from the oblong hole. With this arrangement, the movable top panel can be prevented from coming off by the coming-off preventing member.

Also, the fixed top panel is integrally formed with both or one of a rear grip provided to the vehicle and the base panel. With this arrangement, the number of components can be reduced.

BRIEF DESCRIPTION OF THE DRAWINGS

FIG. 2A is a perspective view showing a state before a placing surface of the rear carrier is enlarged.

FIG. 2B is a perspective view showing a state after the placing surface of the rear carrier is enlarged.

FIG. 6A is a side view of the top box.

FIG. 6B is a view when viewed from an arrow B in FIG. 6A.

FIG. 10A is a cross-sectional view showing that a movable top panel is positioned by lock claws before being slid.

FIG. 10B is a cross-sectional view showing that the movable top panel is positioned by the lock claws after being slid.

DETAILED DESCRIPTION

An exemplary approach to the rear carrier will be described with reference to drawings. Note that in the explanation, description of directions such as front and rear, right and left, and upper and lower is the same as directions with respect to a vehicle body unless otherwise specially described. In the respective drawings, a reference sign FR is indicative of a front side of the vehicle body, a reference sign UP is indicative of an upper side of the vehicle body, and a reference sign LH is indicative of a left side of the vehicle body.

Figure 1:
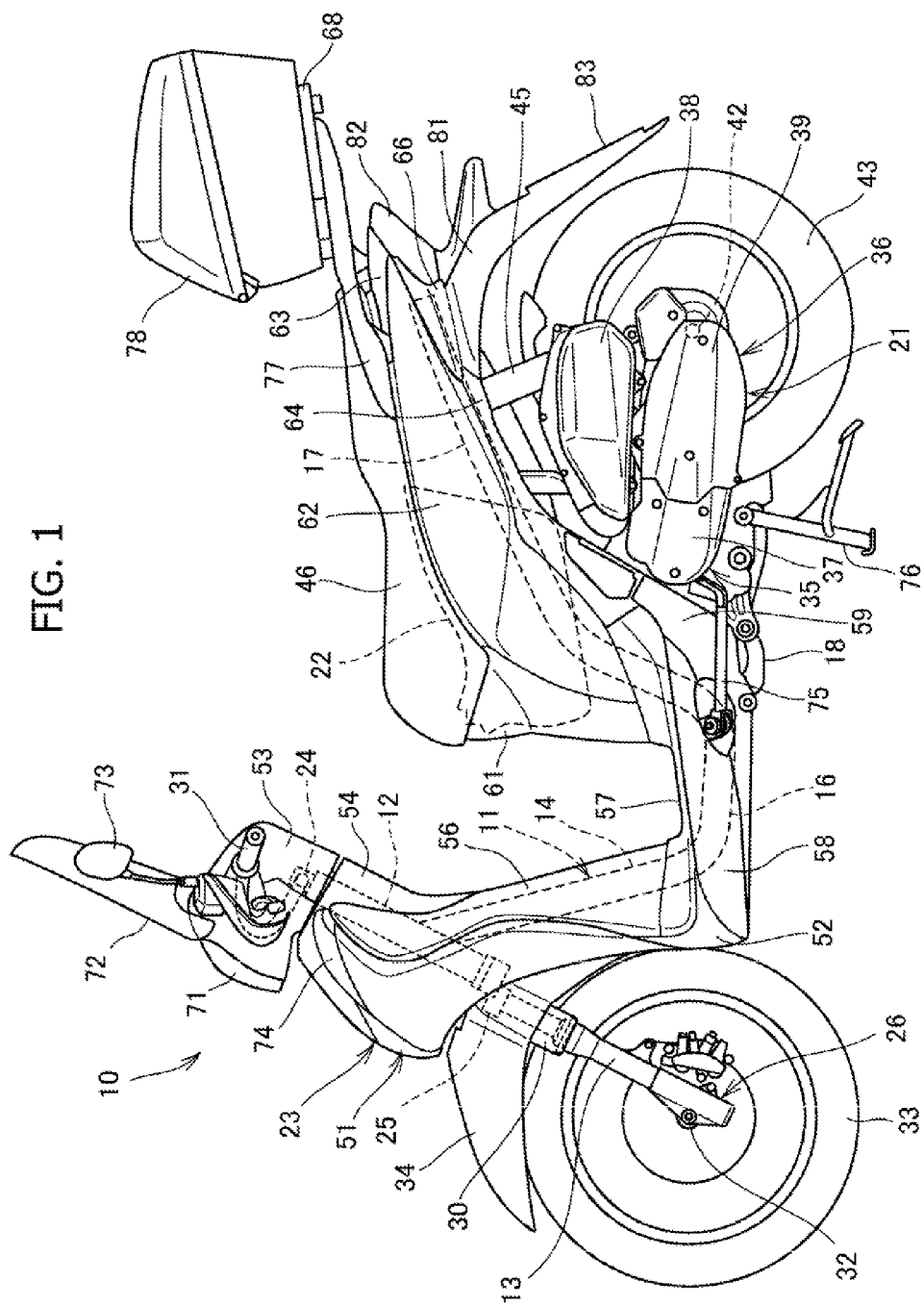
FIG. 1 is a left side view of a motorcycle including a rear carrier.

FIG. 1 is a left side view of a motorcycle 10 including a rear carrier 68. The motorcycle 10 is a saddler-ride type vehicle configured in such a manner that a front fork 13 is steerably attached to a front end of a vehicle body frame 11, a power unit 21 is swingably attached to a lower part of the vehicle body frame 11 through links 18, and a storage box 22 is attached to an upper part of the vehicle body frame 11. A handlebar 31 is attached to an upper end of the front fork 13, a front wheel 33 is supported at a lower end of the front fork 13 through an axle 32, a rear wheel 43 is supported at a rear end of the power unit 21 through an output shaft 42 as an axle, and a seat 46 is attached to an upper part of the storage box 22.

The vehicle body frame 11 is composed of a head pipe 12, a down frame 14, a pair of right and left lower frames 16, and a pair of right and left rear frames 17, and most of the vehicle body frame 11 is covered with a vehicle body cover 23.

The head pipe 12 composes the front end of the vehicle body frame 11, and steerably supports the front fork 13. The down frame 14 extends downward and obliquely rearward from the head pipe 12. The pair of right and left lower frames 16 has front ends coupled to the right and left sides of the down frame 14, extends rearward in a horizontal direction, and is attached with the links 18 that swingably supports the power unit 21. The pair of right and left rear frames 17 integrally extends rearward and obliquely upward from rear ends of the pair of right and left lower frames 16, and is attached with the storage box 22.

The front fork 13 is composed of a steering stem 24 that is rotatably supported by the head pipe 12, a bottom bridge 25 that is attached to a lower end of the steering stem 24, and a pair of right and left cylindrical shock absorbing parts 26 that are attached to both right and left ends of the bottom bridge 25. The handlebar 31 is attached to the upper end of the steering stem 24, and the front wheel 33 is supported at lower ends of the right and left shock absorbing parts 26 through the axle 32. The front wheel 33 is covered with a front fender 34 from above, the front fender being attached to the front fork 13. A pair of right and left fork guards 30 for protecting the front fork 13 is attached to the front fender 34.

The power unit 21 is composed of an engine 35 composing a front part, and a continuously variable transmission 36 integrally provided to a rear part of the engine 35. In the engine 35, a cylinder part provided with a cylinder head, a cylinder block and so on extends substantially forward from a crankcase 37, and an intake device including an air cleaner 38 is connected to the cylinder head. The continuously variable transmission 36 is provided with a transmission case 39 that is integrally provided at a rear end of the crankcase 37, and the rear wheel 43 is attached to a rear end of the transmission case 39 through an output shaft 42. A rear cushion unit 45 is laid between one rear frame 17 and the transmission case 39.

The storage box 22 is configured in such a manner that the seat 46 is openably closably mounted above the storage box.

The vehicle body cover 23 is provided with a front cover 51, a pair of right and left front lower covers 52, a handlebar cover 53, a front inner cover 54, a leg shield 56, a floor step 57, a pair of right and left floor side skirts 58, and a pair of right and left rear side skirts 59.

The front cover 51 covers a front side of an upper part of the front fork 13. The front lower covers 52 are provided to be continuous with a lower end of the front cover 51. The handlebar cover 53 covers a center part of the handlebar 31. The front inner cover 54 covers a rear side of the upper part of the front fork 13. The leg shield 56 covers the rear side of the upper part of the front fork 13, is connected to right and left ends of the front cover 51, and covers front sides of legs of a rider. The floor step 57 extends downward and rearward from a lower end of the leg shield 56, and is made to serve as a footrest for the rider. The floor side skirts 58 extend downward from right and left edges of the floor step 57. The rear side skirts 59 are provided to be continuous with rear ends of the floor side skirts 58.

Further, the vehicle body cover 23 is provided with a center cover 61, a pair of right and left body side covers 62, a rear center cover 63, a pair of right and left body lower covers 64, and a pair of right and left rear side covers 66.

The center cover 61 extends from a rear end of the floor step 57 to a lower side of a front end of the seat 46. The body side covers 62 extend rearward of the vehicle body below a side edge of the seat 46 from the floor step 57 and the center cover 61. The rear center cover 63 covers a portion between rear ends of the right and left body side covers 62 behind the seat 46. The body lower covers 64 extend rearward from the rear end of the floor step 57 along lower edges of the right and left body side covers 62. The rear side covers 66 are connected to the lower edges of the rear ends of the body side covers 62.

The handlebar cover 53 has a front part provided with a headlight 71, an upper part provided with a windshield 72, and right and left ends provided with a pair of right and left rearview mirrors 73. The lower frame 16 is provided with a side stand 75, and a main stand 76 is provided below the crankcase 37.

A rear grip 77 grasped by a pillion passenger is attached to rear parts of the right and left rear frames 17. The rear grip 77 has a rear part provided with the rear carrier 68, and the rear carrier 68 is mounted with a top box 78 that can store the baggage. Note that in the drawing, a reference sign 74 is indicative of each blinker, a reference sign 81 is indicative of a rear fender for covering the rear wheel 43 from above, a reference sign 82 is indicative of a tail lamp, and a reference sign 83 is indicative of a license plate.

FIG. 2 is an illustration for explaining the rear carrier 68. FIG. 2A is a perspective view showing a state before a placing surface of the rear carrier 68 is enlarged, and FIG. 2B is a perspective view showing a state after the placing surface of the rear carrier 68 is enlarged.

As shown in FIGS. 2(A) and 2(B), the rear grip 77 is composed of a pair of rear grip bodies 77a, 77a provided on the sides of the rear frames 17, 17 (see FIG. 1) so that the rider can grasp, and a tabular base panel 77b that is formed integrally with rear ends of the rear grip bodies 77a, 77a.

The rear carrier 68 is provided with the base panel 77b of the rear grip 77, and a top panel 91 provided on the base panel 77b.

The top panel 91 is composed of a fixed top panel 92 that is fixed to the base panel 77b and that has a T shape and a plate-like shape, and a movable top panel 93 that is slidably attached to the base panel 77b and that has a channel shape or a U shape.

The fixed top panel 92 and the movable top panel 93 are provided on the base panel 77b so that upper surfaces 92a, 93a thereof are positioned on the same plane. As shown in FIG. 2B, although the movable top panel 93 is moved rearward from the state shown in FIG. 2A and the placing surface is enlarged rearward, the upper surfaces 92a, 93a are positioned on the same plane.

Figure 3:
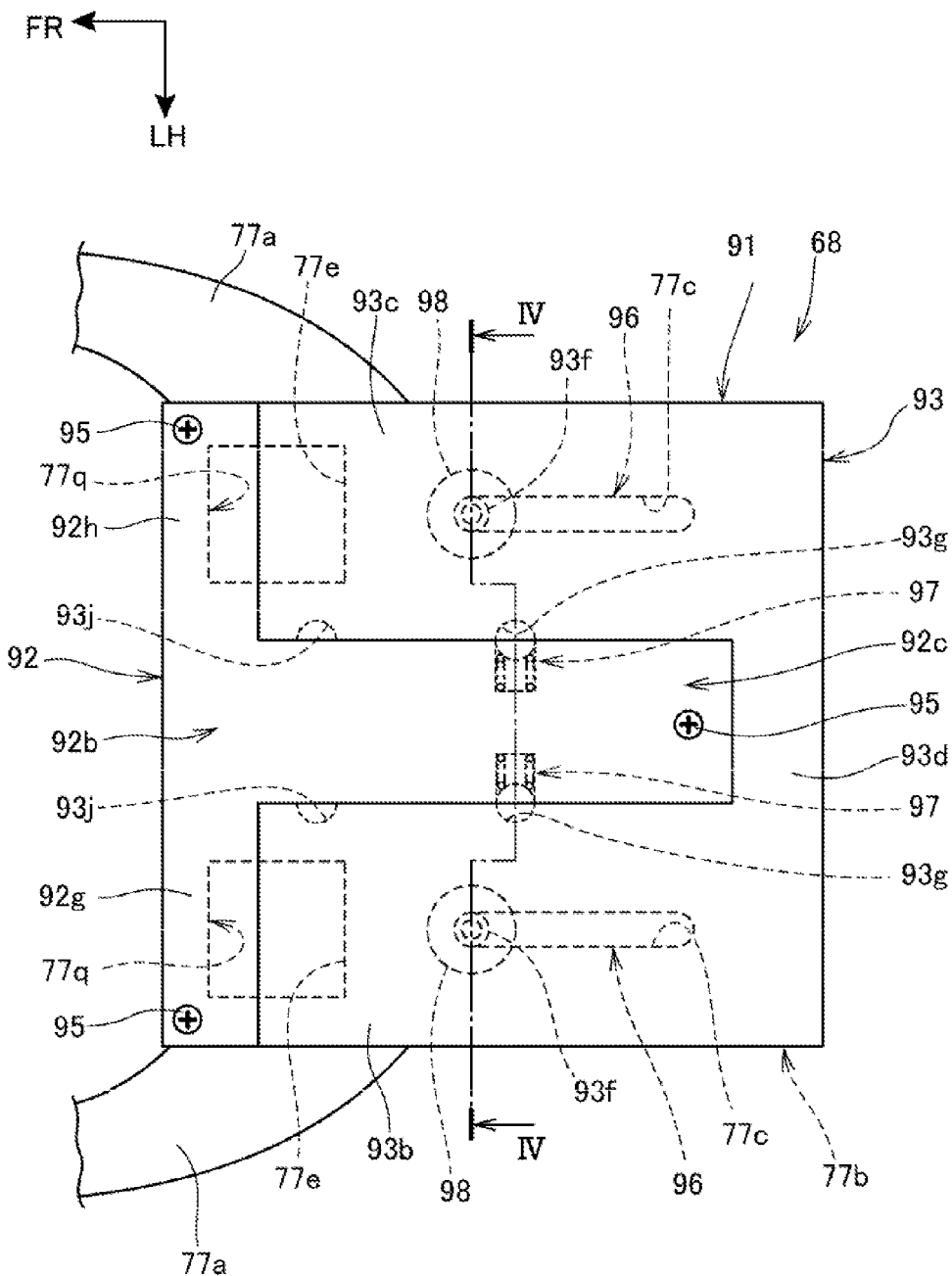
FIG. 3 is a plan view showing the rear carrier.

FIG. 3 is a plan view showing the rear carrier 68. The rear carrier 68 is formed into a rectangular shape in a planar view. The fixed top panel 92 is configured in such a manner that a rectangular crosswise extension part 92b that extends in a vehicle width direction, and a longitudinal extension part 92c that extends rearward from a center part in the vehicle width direction of the crosswise extension part 92b, are integrally formed, and the fixed top panel 92 is attached to the base panel 77b (see FIG. 2A) by a plurality of screws 95. The crosswise extension part 92b is provided with a left extension part 92g that is positioned on a left side in comparison with the longitudinal extension part 92c, and a right extension part 92h that is positioned on a right side in comparison with the longitudinal extension part 92c. Note that although the fixed top panel 92 is formed separately from the base panel 77b (see FIGS. 2(A) and 2(B)), the fixed top panel 92 may be formed integrally with the base panel 77b. With this arrangement, the base panel 77b and the fixed top panel 92 are formed integrally with the rear grip 77.

The movable top panel 93 is composed of a left panel part 93b and a right panel part 93c that are arranged behind the crosswise extension part 92b of the fixed top panel 92 and on both sides in the vehicle width direction of the longitudinal extension part 92c, and a crosswise connection 93d for integrally connecting the left panel part 93b and the right panel part 93c. The fixed top panel 92 and the movable top panel 93 have a profile formed into a rectangular shape before the movable top panel 93 is slid, and have the same shape or substantially the same shape as the base panel 77b in the planar view.

The movable top panel 93 is attached to the base panel 77b through slide mechanisms 96. The slide mechanisms 96 have a mechanism configured in such a manner that the movable top panel 93 is guided and slid by guide parts provided on a side of the base panel 77b. Also, the rear carrier 68 is provided with slide positioning mechanisms 97 that position the movable top panel 93 in both cases before the movable top panel is slid and after the movable top panel is slid. A detailed structure of each of the slide mechanisms 96 and the slide positioning mechanisms 97 will be described with reference to FIG. 4.

Figure 4:
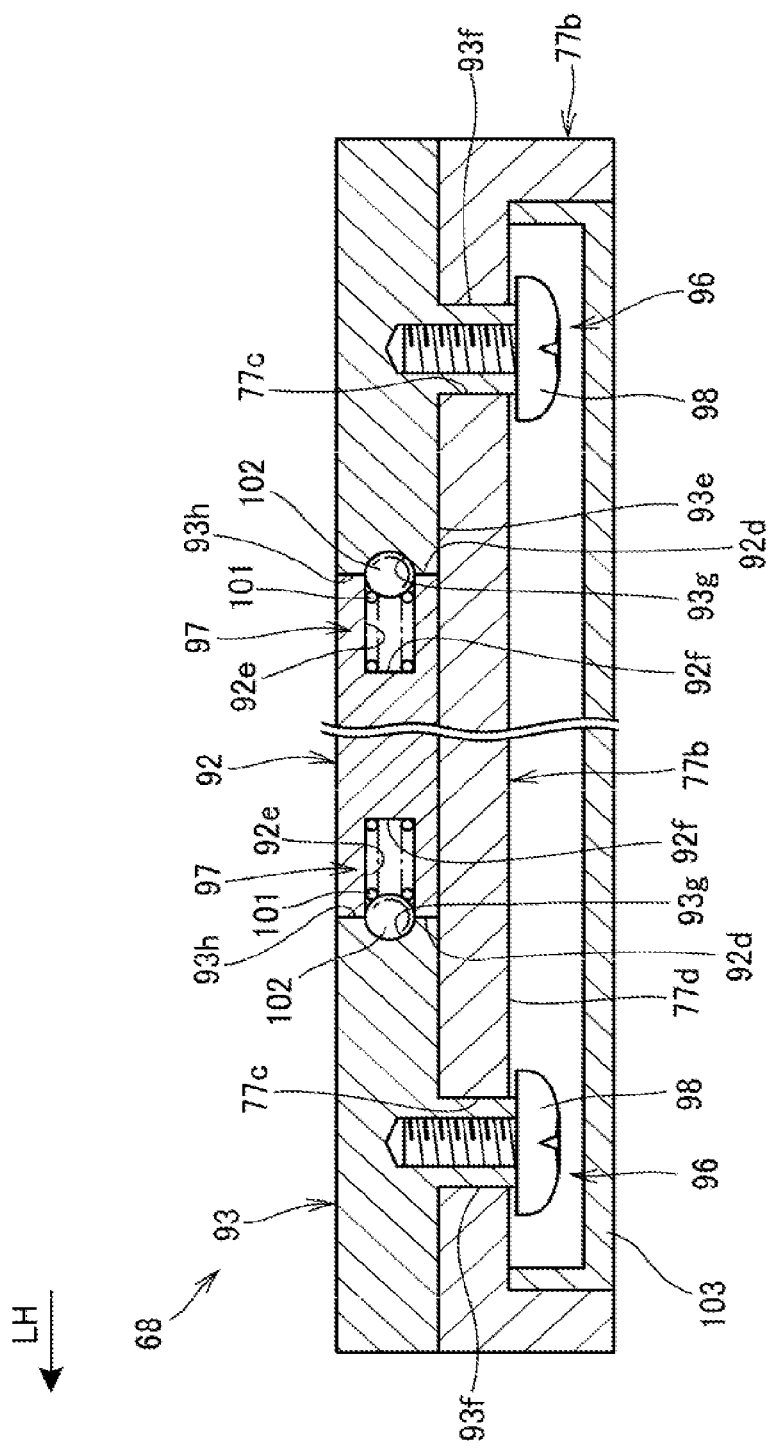
FIG. 4 is a cross-sectional view taken along line Iv-Iv in FIG. 3.

FIG. 4 is a cross-sectional view taken along line IV-IV in FIG. 3. The slide mechanisms 96 are composed of a pair of right and left guide holes 77c, 77c that are formed in the base panel 77b, a pair of right and left projecting guide parts 93f, 93f of the movable top panel 93, and screws 98, 98. The guide holes 77c are formed in the base panel 77b and are formed as an oblong hole so as to extend in a longitudinal direction. The projecting guide parts 93f are integrally protuberantly formed downward from a lower surface 93e of the movable top panel 93 in order to be inserted into the guide holes 77c. The screws 98 are threadedly connected to the projecting guide parts 93f from a side of a lower surface 77d of the base panel 77b. Since outer diameters of head parts of the screws 98 are formed to be larger than outer diameters of the projecting guide parts 93f, the projecting guide parts 93f can be prevented from coming off from the guide holes 77c.

The slide positioning mechanisms 97 are composed of lateral holes 92e formed in the fixed top panel 92, compression coil springs 101, balls 102, and positioning recessed parts 93g. The lateral holes 92e are opened in side end surfaces 92d, 92d of the fixed top panel 92 so as to respectively extend in the vehicle width direction. The compression coil springs 101 are stored in the lateral holes 92e, and each one end thereof abuts on a bottom surface 92f of each lateral hole 92e. The balls 102 are partially stored in the lateral holes 92e, and are urged to sides of side end surfaces 93h of the movable top panel 93 by allowing the other ends of the compression coil springs 101 to abut on the balls. The positioning recessed parts 93g are portions that are provided in the side end surfaces 93h of the movable top panel 93 and that are formed into a recessed shape composing some of spherical surfaces. The balls 102 are pushed to the positioning recessed parts 93g by elastic force of the compression coil springs 101, and are positioned.

In the state shown in the drawing, since the balls 102 are positioned between the fixed top panel 92 and the movable top panel 93, the sliding of the movable top panel 93 with respect to the fixed top panel 92 is restricted, and the movable top panel 93 is positioned. The positioning recessed parts 93g position the movable top panel 93 before the movable top panel is slid. The movable top panel 93 after being slid is positioned by positioning recessed parts 93j shown in FIG. 3.

In the state shown in the drawing, when comparatively large backward sliding force is applied to the movable top panel 93, the balls 102 are separated from the positioning recessed parts 93g against the elastic force of the compression coil springs 101, and are further stored in the lateral holes 92e. With this arrangement, the movable top panel 93 can be slid rearward. Note that a reference sign 103 is indicative of a back panel that covers the base panel 77b from the side of the lower surface 77d so that dust, rainwater, mud or the like is prevented from adhering to sliding parts of the slide mechanisms 96.

Figure 5A:
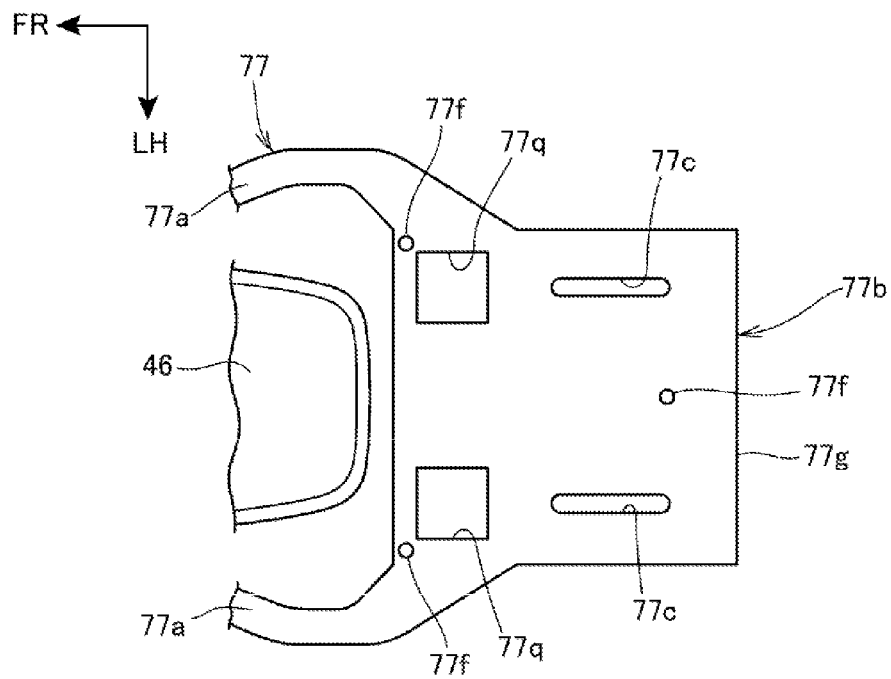
FIG. 5A is a plan view showing a base plate.
Figure 5B:
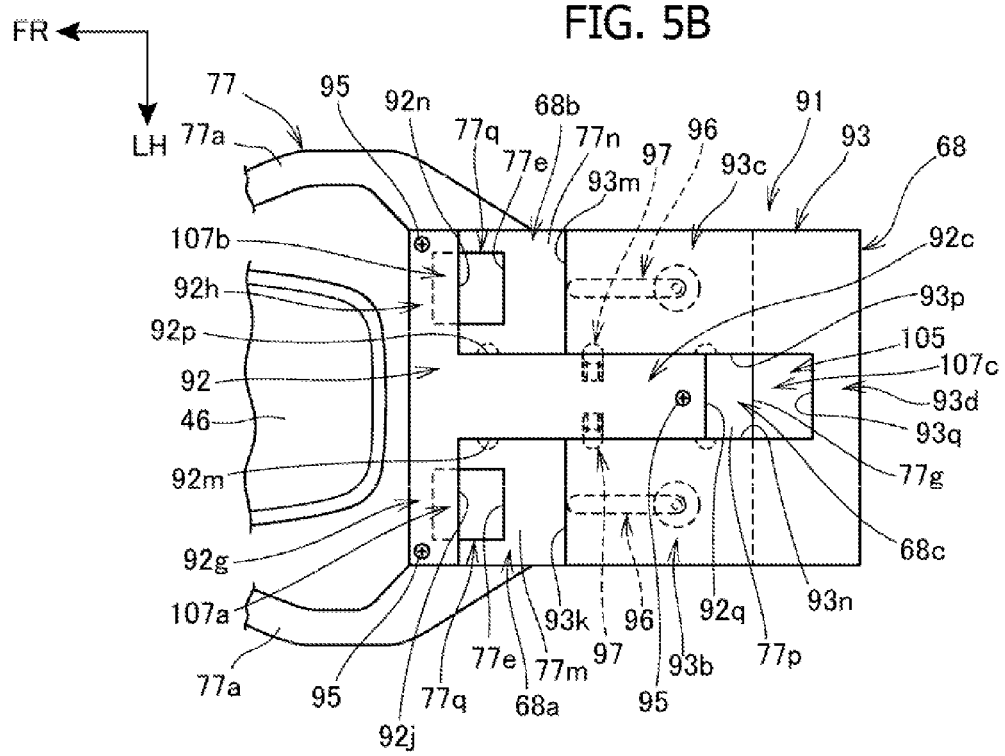
FIG. 5B is a plan view showing exposed parts when a movable top panel is slid.

FIG. 5 is a plan view showing a structure of the rear carrier 68. FIG. 5A is a top plan view showing the base panel 77b, and FIG. 5B is a top plan view showing exposed parts 68a, 68b, 68c when the movable top panel 93 is slid. As shown in FIG. 5A, a pair of right and left window parts 77q, 77q that are arranged side by side in the vehicle width direction is opened in the base panel 77b. A pair of right and left guide holes 77c, 77c is formed behind the window parts 77q, 77q. Note that reference signs 77f are indicative of female screw threads provided for receiving screws 95 (see FIG. 5B) for fixing the fixed top panel 92 (see FIG. 5B) to the base panel 77b.

As shown in FIG. 5B, the window parts 77q, 77q are closed by the fixed top panel 92 and the movable top panel 93 in the state before the movable top panel 93 is slid. Also, with the movable top panel 93 slid to a rear end, exposed parts 77m, 77n, 77p appear on the base panel 77b. In the exposed parts 77m, 77n, front parts of the window parts 77q, 77q are closed by the left extension part 92g and the right extension part 92h of the fixed top panel 92, and rear parts of the window parts 77q, 77q are exposed as openings 77e, 77e. Also, in the exposed part 77p, an opening 105 is formed, the opening being surrounded by a rear end surface 77g of the base panel 77b and the crosswise connection 93d of the movable top panel 93. Here at, the exposed part 68a of the rear carrier 68 is composed of the exposed part 77m of the base panel 77b, the left opening 77e, a rear end surface 92j of the left extension part 92g of the fixed top panel 92, a side end surface 92m of the longitudinal extension part 92c, and a front end surface 93k of the left panel part 93b of the movable top panel 93.

Also, the exposed part 68b of the rear carrier 68 is composed of the exposed part 77n of the base panel 77b, the right opening 77e, a rear end surface 92n of the right extension part 92h of the fixed top panel 92, a side end surface 92p of the longitudinal extension part 92c, and a front end surface 93m of the right panel part 93c of the movable top panel 93. Also, the exposed part 68c of the rear carrier 68 is composed of the exposed part 77p of the base panel 77b, the opening 105, a rear end surface 92q of the fixed top panel 92, an inner end surface 93n of the left panel part 93b of the movable top panel 93, an inner end surface 93p of the right panel part 93c, and a front end surface 93q of the crosswise connection 93d.

As disclosed, edge parts of the openings 77e, 77e, and an edge part of the opening 105 respectively compose top box support parts 107a, 107b, 107c for supporting the top box 78 (see FIG. 1). Detailedly, the top box support parts 107a, 107b, 107c are made to serve as portions for locking hook-shaped engagement parts provided on a bottom part of the top box 78 (see FIG. 1). The top box support part 107a is the left extension part 92g (the edge part of the opening 77e) of the fixed top panel 92, the left extension part covering the front side of the left window part 77q. The top box support part 107b is the right extension part 92h (the edge part of the opening 77e) of the fixed top panel 92, the right extension part covering the front side of the right window part 77q. The top box support part 107c is the crosswise connection 93d (the edge part of the opening 105) of the movable top panel 93, the crosswise connection being arranged behind the opening 105.

The left extension part 92g of the fixed top panel 92 is a part including the rear end surface 92j composing the exposed part 68a. The right extension part 92h of the fixed top panel 92 is a part including the rear end surface 92n composing the exposed part 68b. The crosswise connection 93d of the movable top panel 93 is a part including the front end surface 93q composing the exposed part 68c. For this reason, the top box support parts 107a, 107b are provided to the fixed top panel 92, and the top box support part 107c is provided to the movable top panel 93. That is, the top box support parts 107a, 107b, 107c are provided to the top panel 91.

Procedure to support the top box 78 by the top box support parts 107a, 107b, 107c will be detailedly described later.

FIG. 6 is an illustration showing the top box 78. FIG. 6A is a side view of the top box 78, and FIG. 6B is a view when viewed from an arrow B in FIG. 6A. As shown in FIGS. 6(A), 6(B), the top box 78 is provided with a bottomed box-shaped box body 111, a lid 112 that is openably/closably attached to an upper part of the box body 111, and a pair of right and left downwardly projecting hook-shaped front engagement parts 113 and a downwardly projecting hook-shaped rear engagement part 114 that are provided on a bottom part 111a of the box body 111.

The pair of right and left front engagement parts 113, and the rear engagement part 114 are supported by the top box support parts 107a, 107b, 107c (see FIG. 5B). The front engagement parts 113 are portions that are fixed to the bottom part 111a and that are formed into an L shape in a side view, and are composed of downward extension parts 113a extending downward from the bottom part 111a of the box body 111 and forward extension parts 113b extending forward from lower ends of the downward extension parts 113a. The rear engagement part 114 is a portion that projects from an opening 111b formed in the bottom part 111a, that is swingably supported with respect to the bottom part 111a, and that is formed into the L shape in the side view, and is composed of a downward extension part 114a that extends downward from a side of the bottom part 111a of the box body 111, and a rearward extension part 114b that extends rearward from a lower end of the downward extension part 114a. The rear engagement part 114 composes a part of a top box lock mechanism 120 provided to the top box 78 in order to fix the top box 78 to the rear carrier 68 (see FIG. 5B).

Figure 7A:
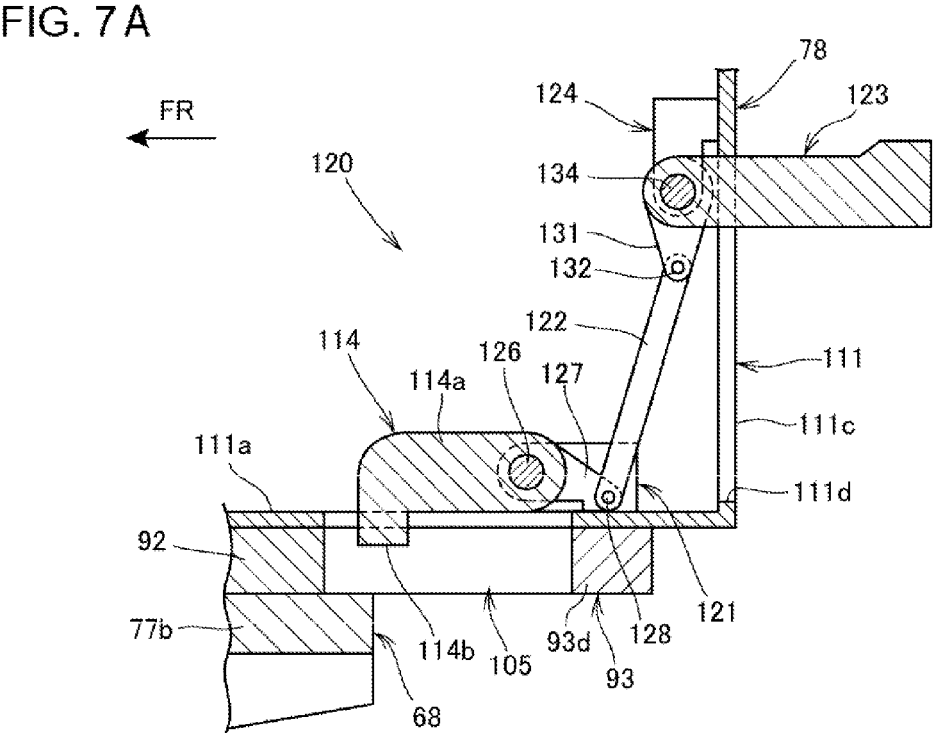
FIG. 7A is a cross-sectional view showing that the top box lock mechanism is unlocked.
Figure 7B:
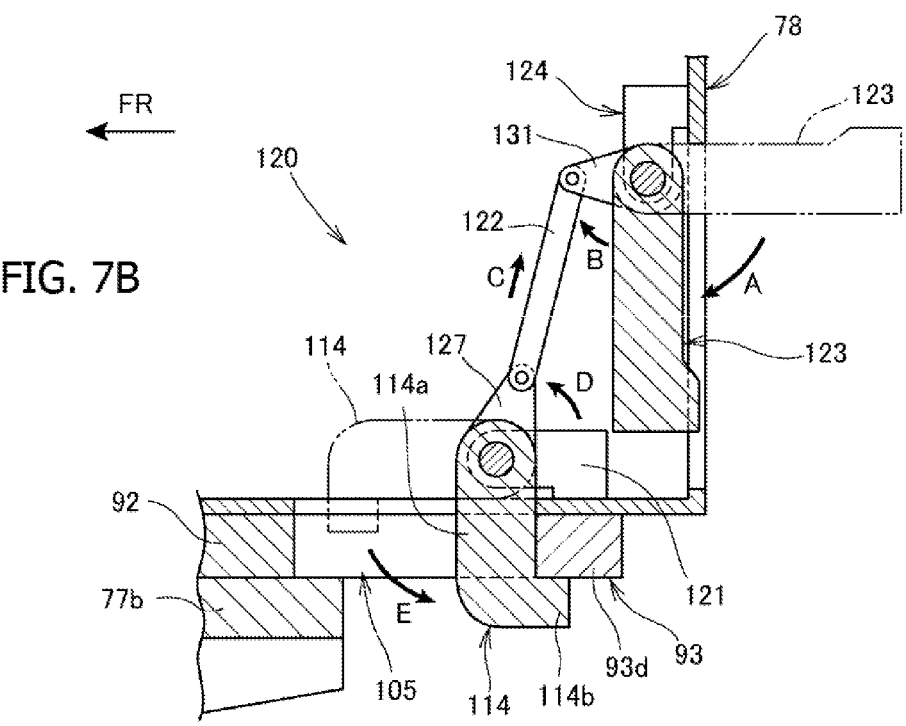
FIG. 7B is a cross-sectional view showing that the top box lock mechanism is locked.

FIG. 7 is a cross-sectional view showing the top box lock mechanism 120. FIG. 7A is a cross-sectional view showing that the top box lock mechanism 120 is unlocked, and FIG. 7B is a cross-sectional view showing that the top box lock mechanism 120 is locked. As shown in FIG. 7A, the top box lock mechanism 120 is provided with a shaft support bracket 121, the rear engagement part 114, a link 122, a lock lever 123, and a shaft support bracket 124.

The shaft support bracket 121 is attached to the bottom part 111a of the box body 111 of the top box 78, and is provided with a spindle 126. The rear engagement part 114 is swingably supported by the spindle 126, and is retained to be arranged along the bottom part 111a. The link 122 has one end that is swingably coupled to an arm part 127 provided to the rear engagement part 114 by a coupling pin 128, and the other end that is swingably coupled to an arm part 131 provided to the lock lever 123 by a coupling pin 132.

The shaft support bracket 124 is attached to a rear wall 111c of the box body 111, and is provided with a spindle 134. The lock lever 123 is swingably supported by the spindle 134, and projects to the outside from a rear opening part 111d formed in the rear wall 111c. In the state shown in the drawing, most of the rear engagement part 114 is positioned in the box body 111, and is put into an unlocked state where the rear engagement part is not engaged with the rear carrier 68.

As shown in FIG. 7B, when the lock lever 123 is swung downward as shown by an arrow A, the arm part 131 of the lock lever 123 is swung upward as shown by an arrow B. As a result, the link 122 is pulled as shown by an arrow C, the arm part 127 of the rear engagement part 114 is swung as shown by an arrow D, and the rear engagement part 114 is swung downward in the opening 105 as shown by an arrow E. With this arrangement, the rear engagement part 114 is engaged with the crosswise connection 93d of the movable top panel 93, and the top box lock mechanism 120 is locked.

Figure 8A:
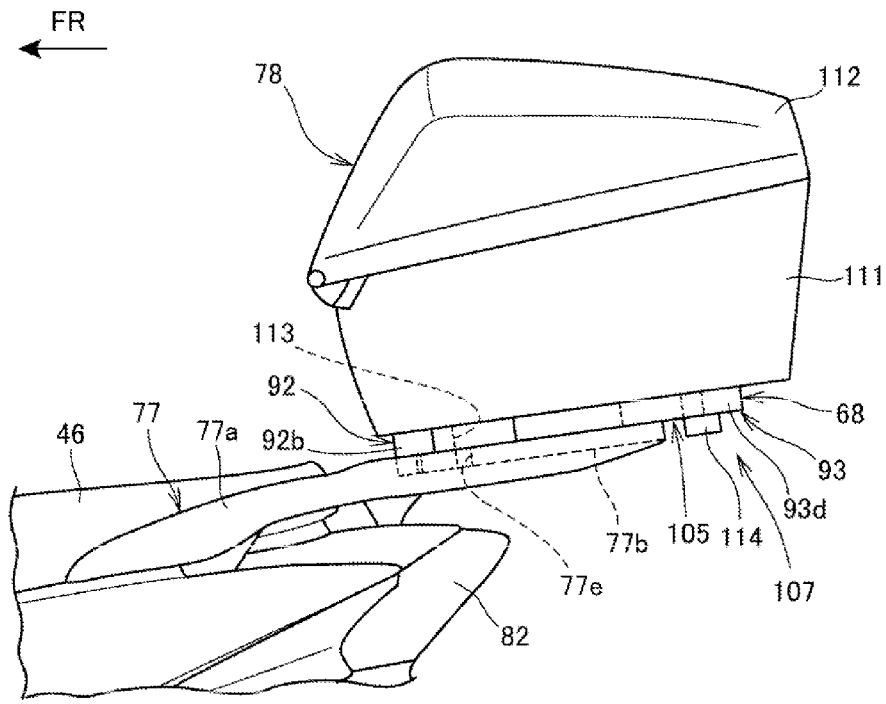
FIG. 8A is a left side view.
Figure 8B:
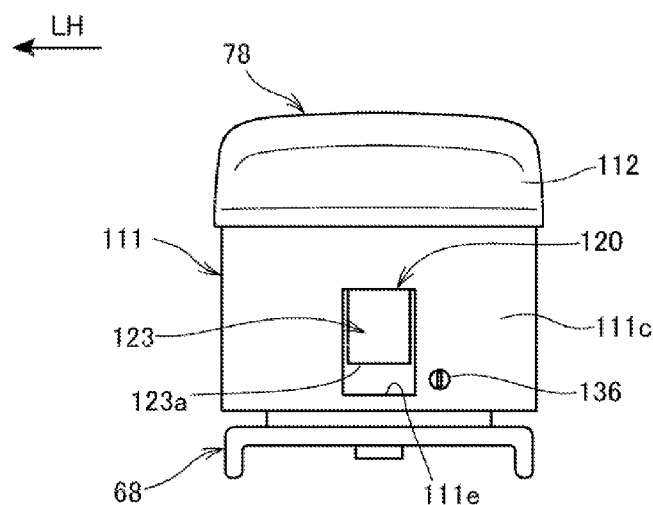
FIG. 8B is a rear view.

FIG. 8 is an illustration showing that the top box 78 is fixed to the rear carrier 68. FIG. 8A is a left side view, and FIG. 8B is a rear view. As shown in FIGS. 8(A), 8(B), with the right and left front engagement parts 113 of the top box 78 passed through the openings 77e, the right and left front engagement parts 113 of the top box 78 are engaged with the left extension part 92g and the right extension part 92h (see FIG. 5B) of the fixed top panel 92, and with the rear engagement part 114 of the top box 78 passed through the opening 105, the rear engagement part 114 of the top box 78 is engaged with the crosswise connection 93d of the movable top panel 93.

The lock lever 123 composing the top box lock mechanism 120 (see FIGS. 7(A), 7(B)) is positioned in a rear wall recessed part 111e formed in the rear wall 111c of the box body 111. In this state, when a finger or fingers including a thumb are hooked on an end 123a of the lock lever 123 and the lock lever 123 is swung upward, the top box lock mechanism 120 is unlocked, and the top box 78 can be detached from the rear carrier 68. Note that a reference sign 136 is indicative of a key cylinder composing the lock mechanism that locks the lid 112 with respect to the box body 111.

As shown in FIG. 1, FIG. 3, FIG. 5B, and FIG. 8A as above, in the rear carrier 68 for the motorcycle 10 as the saddle-ride type vehicle including the slide mechanisms 96 that are positioned behind the seat 46 and that are configured to enlarge and/or contract the placing surface, the rear carrier 68 is composed of the base panel 77b that is provided to the side of the vehicle body, and the top panel 91 that is positioned on the upper part of the base panel 77*b*. The top panel 91 is composed of the fixed top panel 92 that is provided to the base panel 77*b*, and the movable top panel 93 that is slidable to the rear with respect to the base panel 77*b* by the slide mechanisms 96. The respective upper surfaces of the fixed top panel 92 and the movable top panel 93 are positioned on the same plane. The top box support parts 107*a*, 107*b*, 107*c* for supporting the top box 78 are provided to the exposed parts 68*a*, 68*b*, 68*c* that are provided to the base panel 77*b* and/or the top panel 91 in order to be exposed by sliding the movable top panel 93.

With this constitution, since the top panel 91 is divided into the fixed top panel 92 and the movable top panel 93, and the upper surfaces 92*a*, 93*a* of the fixed top panel 92 and the movable top panel 93 are positioned on the same plane, the bulky baggage or the like can be stably placed. Also, since the top box support parts 107*a*, 107*b*, 107*c* are provided to the exposed parts 68*a*, 68*b*, 68*c* that are exposed by sliding the movable top panel 93, when the top box 78 is not mounted, the top box support parts 107*a*, 107*b*, 107*c* are prevented from being exposed, and the appearance quality can be secured. Also, when the top box 78 is mounted, after creating such a state that the placing surface is necessarily enlarged and the load can be stably received, the top box 78 can be arranged.

Also, the fixed top panel 92 is formed into the T shape in the planar view, the movable top panel 93 is formed into the U shape in the planar view, and the top panel 91 takes the form of the substantially rectangular shape in the planar view when mounting the top box 78. With this arrangement, the fixed top panel 92 and the movable top panel 93 are excellently combined with each other, and the top panel 91 is formed into the substantially rectangular shape in the planar view when the top box 78 is mounted. For this reason, the appearance quality can be secured.

Also, the fixed top panel 92 is composed of the crosswise extension part 92*b* that extends in the vehicle width direction and the longitudinal extension part 92*c* that extends rearward from the crosswise extension part 92*b*. The pair of right and left openings 77*e*, 77*e* as the front openings that are located immediately behind the crosswise extension part 92*b* and that are formed in the base panel 77*b* across the longitudinal extension part 92*c*, and the opening 105 as the rear opening that is formed of the base panel 77*b* and the movable top panel 93, appear in the exposed parts 68*a*, 68*b*, 68*c* when the movable top panel 93 is slid rearward. The top box support parts 107*a*, 107*b*, 107*c* are formed of the edges of the openings 77*e*, 77*e* and the opening 105. With this arrangement, the movable top panel 93 having the channel shape or the U shape in the planar view is only slid rearward, so that the edge parts of the openings 77*e*, 77*e* and the opening 105 that support the top box 78 at the two front points and the one rear point appear, and the top box 78 can be stably supported at the three points.

Also, since the position of the one rear point can be adjusted by sliding, if, for example, a plurality of second engagement recessed parts 143*c*, 143*c* are formed side by side in the longitudinal direction, the degree of freedom in positioning of the movable top panel 143 after being slid can be increased, and a plurality of top boxes 78 having claws capable of being engaged with the openings 77*e*, 77*e* and the opening 105 and having different capacity can be supported in optional positions.

Also, as shown in FIG. 5B, FIGS. 6(A), 6(B), and FIGS. 7(A), 7(B), the top box 78 is provided with the pair of right and left front engagement parts 113, 113 as front locking claws and the rear engagement part 114 as the rear locking claw that are provided in the positions corresponding to the openings 77*e*, 77*e* and the opening 105. The front engagement parts 113 are fixed. The rear engagement part 114 is formed to be movable according to the position of the lock lever 123 as the lever. The rear engagement part 114 is locked when the lock lever 123 is stored, and the rear engagement part 114 is unlocked when the lock lever 123 is released. With this arrangement, by the state of the lock lever 123, it is easy to confirm whether or not the top box 78 is locked.

Also, as shown in FIG. 3 and FIG. 4, the slide mechanism 96 are the guide holes 77*c* as the projecting rails, the recessed grooves, or the oblong holes that are formed with respect to the base panel 77*b*, and are the mechanisms configured to be fitted into or around the recessed parts or the projecting guide parts 93*f* as the projecting parts that are formed with respect to the movable top panel 93. With this arrangement, easy assembly can be achieved and costs can be suppressed.

Also, the slide mechanisms 96 are the mechanisms configured in such a manner that the projecting guide parts 93*f* as the projecting parts projecting from the movable top panel 93 are fitted into the guide holes 77*c* as the oblong holes formed in the base panel 77*b*, and the screws 98 as the coming-off preventing members are provided for preventing the projecting guide parts 93*f* from coming off from the guide holes 77*c*. With this arrangement, the movable top panel 93 can be prevented from coming off by the screws 98.

Also, as shown in FIG. 1, and FIGS. 5(A), 5(B), the fixed top panel 92 is integrally formed with both or one of the rear grip 77 provided to the vehicle and the base panel 77*b*. With this arrangement, the number of components can be reduced.

Figure 9:
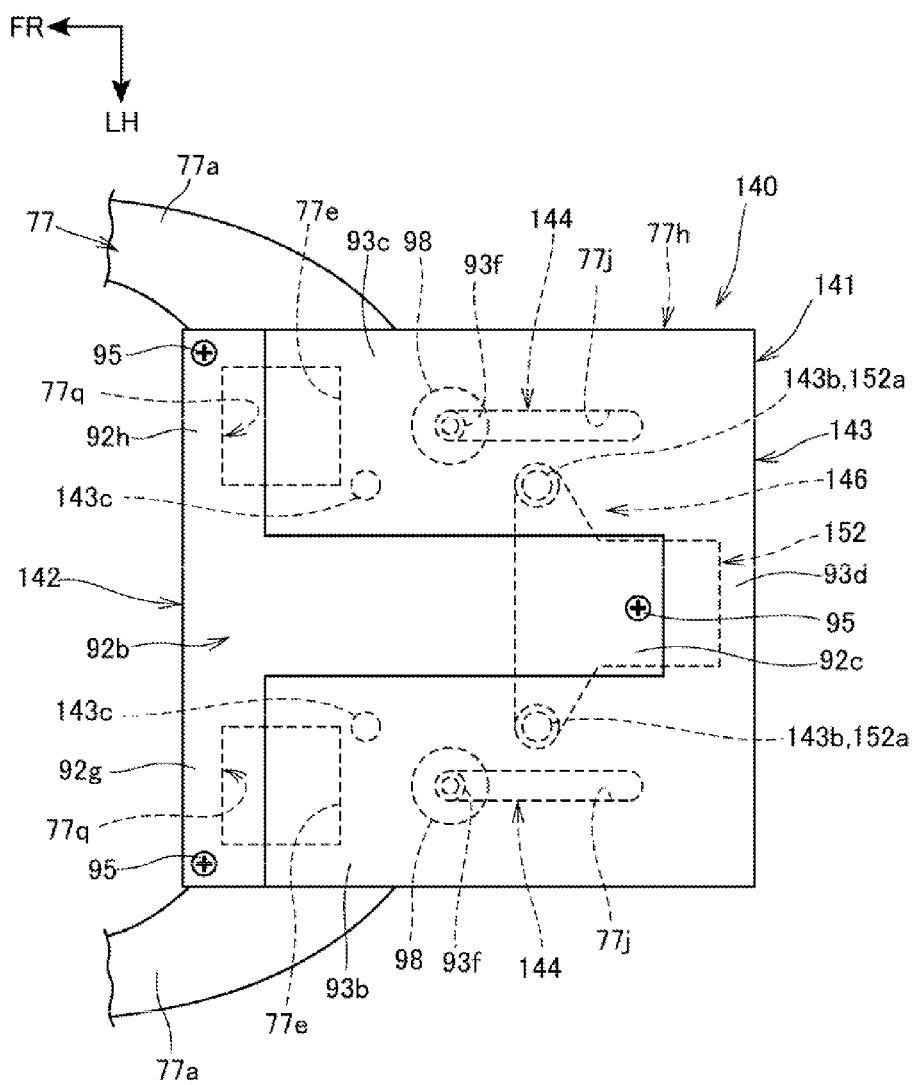
FIG. 9 is a plan view showing a rear carrier according to another exemplary approach.

FIG. 9 is a plan view showing a rear carrier 140 according to another exemplary approach. The rear carrier 140 is provided with a base panel 77*h* that is formed integrally with a rear grip 77 (see FIG. 1), and a top panel 141 that is provided on the base panel 77*h*. A top box 158 (see FIG. 11B) can be attached to the rear carrier 140.

The base panel 77*h* has the same outer shape as the base panel 77*b* (see FIG. 5A) in the earlier-disclosed approach, and is provided with a pair of right and left openings 77*e*, 77*e*, and a pair of right and left oblong guide holes 77*j*, 77*j* that are provided behind the openings 77*e*, 77*e* and that extend in a longitudinal direction. The guide holes 77*j* are formed to be longer than the guide holes 77*c* (see FIG. 5A) in the earlier-disclosed approach. The top panel 141 is provided with a fixed top panel 142 that is attached to the base panel 77*h* by a plurality of screws 95, and a movable top panel 143 that is movably attached to the base panel 77*h* through slide mechanisms 144.

In comparison with the fixed top panel 92 (see FIG. 3 and FIG. 4) in the earlier-disclosed approach, the fixed top panel 142 is not formed with the lateral holes 92*e* (see FIG. 4) formed in the slide positioning mechanisms 97 (see FIG. 4). For the rest, the fixed top panel 142 has the same configuration as the fixed top panel 92. In comparison with the movable top panel 93 (see FIG. 3 and FIG. 4) in the earlier-disclosed approach, the movable top panel 143 is not provided with the slide positioning mechanisms 97. Instead, the movable top panel 143 is provided with a slide positioning mechanism 146. For the rest, the movable top panel 143 has the same configuration as the movable top panel 93.

In comparison with the guide holes 77*c* formed in the slide mechanisms 96 shown in FIG. 3 and FIG. 4, in the slide mechanisms 144, there is only one difference in guide holes 77*j*. That is, the guide holes 77*j* are formed to be longer in a longitudinal direction than the guide holes 77c. With this arrangement, a backward travel distance of the movable top panel 143 can be made to be longer than the movable top panel 93. In FIG. 10, a structure and action of the slide positioning mechanism 146 will be described.

FIG. 10 is a cross-sectional view showing the slide positioning mechanism 146. FIG. 10A is a cross-sectional view showing that the movable top panel 143 is positioned by lock claws 152a before the movable top panel is slid, and FIG. 10B is a cross-sectional view showing that the movable top panel 143 is positioned by the lock claws 152a after the movable top panel is slid. As shown in FIG. 10A, the slide positioning mechanism 146 is provided with a spindle 151, a lock member 152, a torsion coil spring 153, through holes 77k, a pair of right and left first engagement recessed parts 143b, and a pair of right and left second engagement recessed parts 143c.

The spindle 151 is provided on a side of the base panel 77h, and the lock member 152 is swingably supported by the spindle 151. The lock member 152 is provided with lock claws 152a that extend to one side from a side of the spindle 151, and a pressing piece 152b that extends to the other side from the side of the spindle 151. The pressing piece 152b is exposed to the outside from an opening 155a formed in a rear part of a back panel 155 for covering the base panel 77h from below. For this reason, the pressing piece 152b can be push-pressed by a finger or fingers including a thumb.

The torsion coil spring 153 urges the lock member 152 to a locking side. The through holes 77k are opened in the base panel 77h so that the lock claws 152a of the lock member 152 are passed therethrough. The pair of right and left first engagement recessed parts 143b and the pair of right and left second engagement recessed parts 143c are formed side by side in the longitudinal direction in a bottom surface 143a of the movable top panel 143 so that the lock claws 152a are inserted therein. The first engagement recessed parts 143b on one side are portions where positions before the movable top panel 143 is slid are positioned by the lock claws 152a. The second engagement recessed parts 143c on the other side are portions where positions after the movable top panel 143 is slid are positioned by the lock claws 152a.

With reference to FIG. 9 again, the first engagement recessed parts 143c and the second engagement recessed parts 143c are formed side by side in the longitudinal direction in respective left panel parts 93b, 93c of the movable top panel 143. Also, the lock member 152 of the slide positioning mechanism 146 is composed of a lock claw support part 152c with the lock claws 152a provided at right and left ends, and a pressing piece 152b that is formed integrally with the rear end of the lock claw support part 152c.

In FIG. 10A, in order to slide the movable top panel 143 to the rear side, the pressing piece 152b is pushed upward as shown by an arrow F, the lock claws 152a are swung as shown by an arrow G, and the lock claws 152a are disengaged from the first engagement recessed parts 143b. As shown in FIG. 10B, the movable top panel 143 is slid to the rear side as shown by an arrow H, pressing of the pressing piece 152b pressed is subsequently stopped, and the lock claws 152a are swung as shown by an arrow J so as to be engaged with the second engagement recessed parts 143c. With this arrangement, sliding of the movable top panel 143 in the position after the movable top panel is slid is restricted, and the movable top panel 143 is positioned.

Figure 11A:
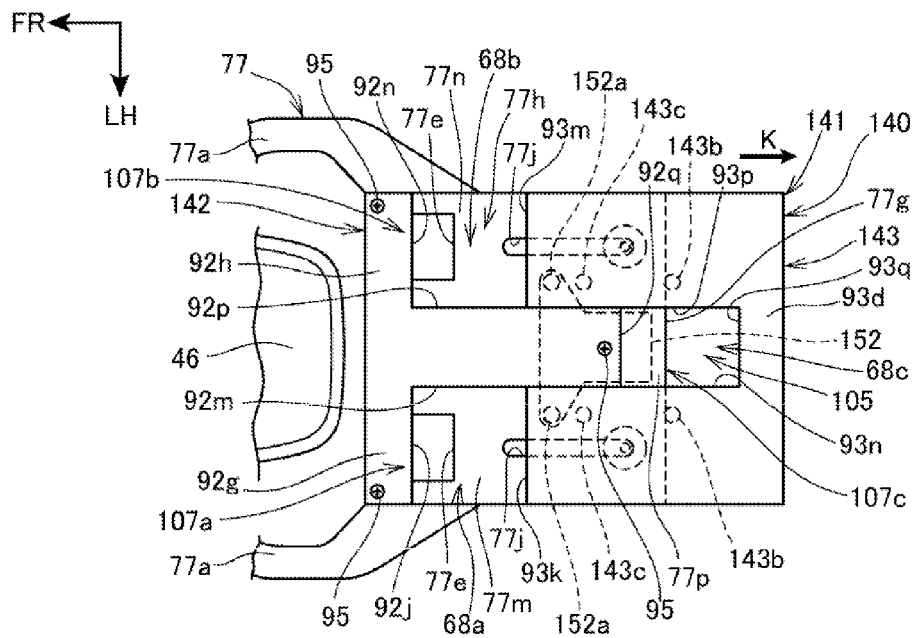
FIG. 11A is an action diagram showing action on a side of the rear carrier
Figure 11B:
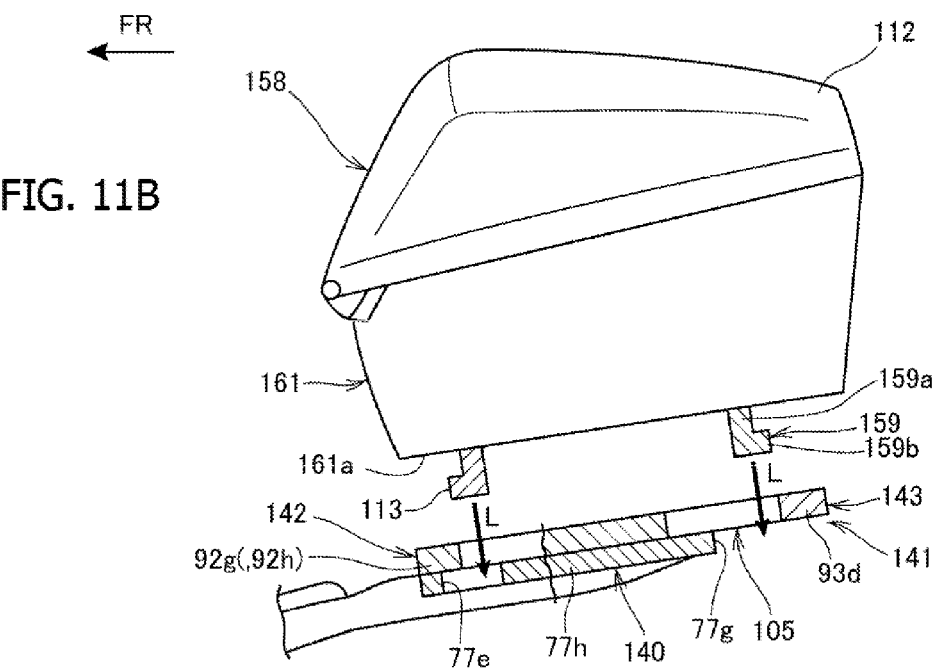
FIG. 11B is an action diagram showing action on a side of the top box.
Figure 12:
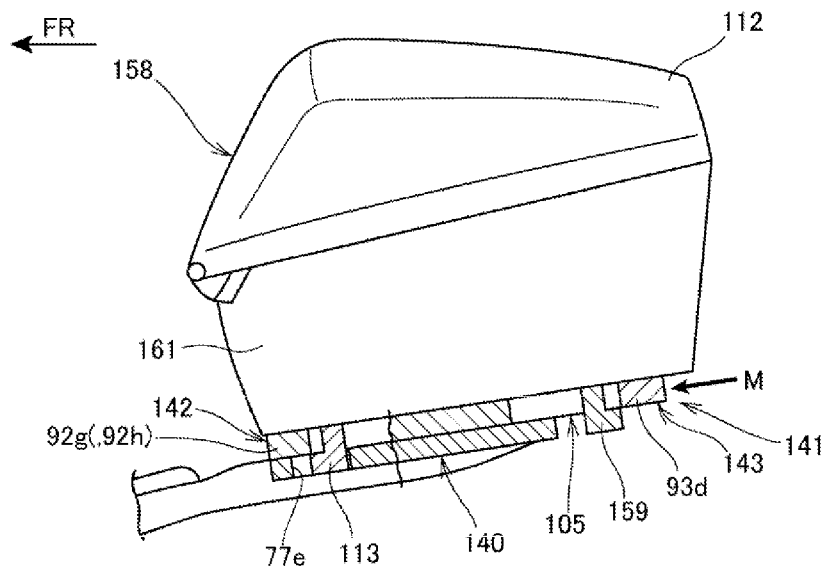
FIG. 12A is an action diagram showing a state before the top box is locked to the rear carrier.
FIG. 12B is an action diagram showing a state after the top box is locked to the rear carrier.
Figure 12B:
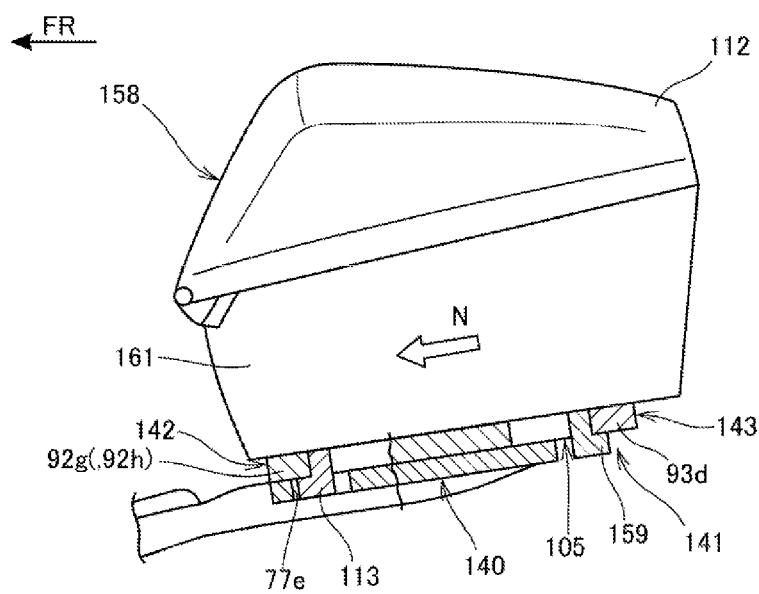

Next, installation procedure of the top box 158 with respect to the rear carrier 140 will be described. FIG. 11 is a first action diagram showing the installation procedure of the top box 158, FIG. 11A is an action diagram showing action on a side of the rear carrier 140, and FIG. 11B is an action diagram showing action on a side of the top box 158. FIG. 12 is a second action diagram showing the installation procedure of the top box 158, FIG. 12A is an action diagram showing a state before the top box 158 is locked to the rear carrier 140, and FIG. 12B is an action diagram showing a state after the top box 158 is locked to the rear carrier 140.

As shown in FIG. 11A, the movable top panel 143 is slid to a backmost side as shown by an arrow K. At this time, the second engagement recessed parts 143c, 143c formed in the movable top panel 143 are positioned behind the right and left lock claws 152a, 152a of the lock member 152. That is, the movable top panel 143 is unnecessarily pushed to the rear side with respect to a fixing position of the top box 158 (see FIG. 12B).

As shown in FIG. 11B, the top box 158 is composed of a bottomed box-shaped box body 161, and a lid 112 that is openably/closably attached to an upper part of the box body 161. A pair of right and left front engagement parts 113, and a downwardly projecting hook-shaped rear engagement part 159 are fixed to a bottom part 161a of the box body 161. The rear engagement part 159 is a portion that is fixed to the bottom part 111a and that forms an L shape in a side view, and is provided with a downward extension part 159a that extends downward from the bottom part 161a of the box body 161, and a rearward extension part 159b that extends rearward from a lower end of the downward extension part 159a.

When the top box 158 is attached to the rear carrier 140, firstly, the pair of right and left front engagement parts 113 and the rear engagement part 159 of the top box 158 are inserted into the openings 77e, 77e, 105 formed in the rear carrier 140 as shown by arrows L, L.

In FIG. 12A, the movable top panel 143 is slid forward as shown by an arrow M until the movable top panel 143 is stopped. As a result, as shown in FIG. 12B, the top box 158 is moved forward as shown by an outline arrow N, the front engagement parts 113 and the rear engagement part 159 are also moved forward, the front engagement parts 113 are engaged with the left extension part 92g and the right extension part 92h of the fixed top panel 142, the rear engagement part 159 is engaged with the crosswise connection 93d of the movable top panel 143, and the top box 158 is fixed to the rear carrier 140.

At this time, as shown in FIG. 10B, the lock claws 152a of the slide positioning mechanism 146 are engaged with the second engagement recessed parts 143c. For example, in FIGS. 11(A), 11(B) and FIGS. 12(A), 12(B), when the downward extension part 159a of the rear engagement part 159 is formed to be longer to a downward direction, and the rearward extension part 159b is formed as a forward extension part that extends forward, the rear engagement part having the longer downward extension part and the forward extension part is inserted into the opening 105, the right and left front engagement parts 113 are inserted into the openings 77e, and the movable top panel 143 is slid forward. With this arrangement, the rear engagement part having the longer downward extension part and the forward extension part can be engaged with the edge part on the side of the rear end surface 77g of the base panel 77h, and also the right and left front engagement parts 113 can be engaged with the left extension part 92g and the right extension part 92h of the fixed top panel 142. The rear end surface 77g of the base panel 77h is a portion included in the opening 105 composing the exposed part 68c. In view of this, the top box support parts 107a, 107b are provided to the top panel 141, and the above-described top box support part on the side of the rear end surface 77g is provided to the base panel 77h.

As shown in FIG. 9, FIGS. 10(A), 10(B), FIGS. 11(A), 11(B) and FIGS. 12(A), 12(B) as above, the top box 158 is provided with the pair of right and left front engagement parts 113, 113 and the rear engagement part 159 that are arranged in the positions corresponding to the openings 77e, 77e and the opening 105. The front engagement parts 113 and the rear engagement part 159 are fixed, the movable top panel 143 is moved to the backmost side, the front engagement parts 113, 113 and the rear engagement part 159 are inserted into the openings 77e, 77e and the opening 105, and the movable top panel 143 is subsequently moved forward. Thereby, the lock member 152 as the locking member urged by the torsion coil spring 153 as the elastic member provided to the base panel 77h is fitted into the second engagement recessed part 143c as the recessed part formed in the movable top panel 143. For this reason, the movable top panel 143 can be slidably locked by such a simple operation that the movable top panel 143 is moved to the backmost side, the front engagement parts 113 and the rear engagement part 159 of the top box 158 are inserted, and the movable top panel 143 is moved forward. The movable top panel 143 can be unlocked by such a simple operation that the urging of the torsion coil spring 153 is canceled and the movable top panel 143 is pulled rearward.

Although the present disclosure has been described herein with respect to a number of specific illustrative examples, the foregoing description is intended to illustrate, rather than to limit the disclosure. Those skilled in the art will realize that many modifications of the illustrative examples could be made which would be operable. All such modifications, which are within the scope of the claims, are intended to be within the scope and spirit of the present disclosure.

For example, in the above-described exemplary approach, as shown in FIG. 3 and FIG. 4, the slide mechanisms 96 are configured in such a manner that the oblong guide holes 77c formed in the base panel 77b are fitted around the projecting guide parts 93f formed with respect to the movable top panel 93; however, the present disclosure is not limited thereto. The projecting rails may be formed with respect to the base panel 77b, the recessed parts may be formed in the movable top panel 93, and the recessed parts may be fitted around the projecting rails. The recessed grooves may be formed in the base panel 77b, the projecting parts may be formed in the movable top panel 93, and the projecting parts may be fitted into the recessed grooves.

Also, as shown in FIG. 2, the base panel 77b is formed integrally with the rear grip 77; however the present disclosure is not limited thereto. The rear grip 77 and the base panel 77b may be formed separately from each other, and the base panel 77b and the fixed top panel 92 may be formed integrally with each other.

Also, as shown in FIG. 6A, the front engagement parts (front locking claws) 113 are fixed and the rear engagement part (rear locking claw) 114 are formed to be movable; however, the present disclosure is not limited thereto. The front engagement parts 113 may be formed to be movable, and the rear engagement part 114 may be fixed.

The present disclosure is not limited to the case applied to the motorcycle 10, and can be applied also to the saddle-ride type vehicles including also vehicles other than the motorcycle 10. Note that the saddle-ride type vehicles include all vehicles such that the rider rides the vehicle astride the vehicle body, and include not only the motorcycles (including motorized bicycles) but also three-wheeled vehicles and four-wheeled vehicles classified into ATVs (All Terrain Vehicles).

The invention claimed is:

1. A rear carrier for a saddle-ride vehicle, said rear carrier comprising:
    a base panel for installation on a saddle-ride vehicle body;
    a top panel that is positioned on an upper part of the base panel, the top panel comprising a fixed top panel portion that is fixedly attached to the base panel, and a movable top panel portion that is configured to be slidable to a vehicle rear direction with respect to the base panel, wherein respective upper surfaces of the fixed top panel portion and the movable top panel portion are positioned on a same plane, and cooperate to define a placing surface;
    a cargo box attachment part for use in attaching a cargo box to the carrier, the cargo box attachment part comprising an engaging part that is formed on at least on one of the base panel and the top panel, the engaging part configured to be exposed by sliding the movable top panel portion in the vehicle rear direction; and
    a slide mechanism that is configured for placement behind a seat of the vehicle, and that is configured to allow the movable top panel portion to be slidably movable in relation to the fixed top panel portion in order to enlarge or contract the placing surface.

2. The rear carrier for the saddle-ride vehicle according to claim 1,
    wherein the fixed top panel portion is formed into a T shape in a top plan view,
    the movable top panel portion is formed into a U shape in the top plan view, and
    the top panel is in a form of a substantially rectangular shape in the top plan view when the cargo box is mounted on the top of the rear carrier in a secured position.

3. The rear carrier for the saddle-ride vehicle according to claim 1,
    wherein the fixed top panel portion comprises a crosswise extension part that extends in a vehicle width direction and a longitudinal extension part that extends rearward from the crosswise extension part,
    a pair of right and left front openings that are located immediately behind the crosswise extension part and that are formed in the base panel across the longitudinal extension part, and a rear opening that is formed of the base panel and the movable top panel portion, appear in the engaging part when the movable top panel portion is slid rearwardly, and
    the cargo box attachment part is formed of edges of each of the front openings and the rear opening.

4. The rear carrier for the saddle-ride vehicle according to claim 3, further comprising a cargo box, wherein:
    the cargo box has a pair of right and left front locking claws and a rear locking claw, which are disposed in positions corresponding to the front openings and the rear opening,
    the front locking claws are operatively attached to a bottom part of the cargo box,
    the rear locking claw is formed to be movable according to a position of a lever,
    the rear locking claw is locked when the lever is stored, and
    the rear locking claw is unlocked when the lever is released.

5. The rear carrier for the saddle-ride vehicle according to claim 3, further comprising a cargo box, wherein:
- the cargo box has a pair of right and left front locking claws and a rear locking claw that are in positions corresponding to the front openings and the rear opening,
- the front locking claws and the rear locking claw are operatively attached to a bottom part of the cargo box, and
- a locking member that is urged by an elastic member provided to the base panel is fitted into a recessed part formed in the movable top panel portion in such a manner that the movable top panel portion is moved to a backmost side, the front locking claws and the rear locking claw are inserted into the front openings and the rear opening, and after that, the movable top panel portion is moved forward.

6. The rear carrier for the saddle-ride vehicle according to claim 1, wherein the slide mechanism comprises at least one of a projecting rail, a recessed groove, or an oblong hole that is formed on the base panel, and comprises a mechanism configured to be fitted into or around a recessed part or a projecting part that is formed with respect to the movable top panel portion.

7. The rear carrier for the saddle-ride vehicle according to claim 6, wherein the slide mechanism is configured in such a manner that a projecting part projecting from the movable top panel portion is fitted into an oblong hole formed in the base panel, and a retention member is configured to prevent the projecting part from coming off from the oblong hole.

8. The rear carrier for the saddle-ride vehicle according to claim 1, wherein the fixed top panel portion is integrally formed with at least one of a rear grips to the vehicle and the base panel.

9. A rear carrier for a saddle-ride vehicle, said rear carrier comprising:
- a base panel for installation on a saddle-ride vehicle body,
- a top panel that is positioned on an upper part of the base panel, the top panel comprising a fixed top panel portion that is fixedly attached to the base panel, and a movable top panel portion that is configured to be slidable to the rear with respect to the base panel, wherein respective upper surfaces of the fixed top panel portion and the movable top panel portion are positioned on a same plane, and cooperate to define a placing surface;
- a cargo box attachment part for use in attaching a cargo box to the carrier, the cargo box support member comprising an engaging part that is formed on at least on one of the base panel and the top panel, the engaging part configured to be exposed by sliding the movable top panel portion in the vehicle rear direction; and
- a slide mechanism that is configured for placement behind a seat of the vehicle, and that is configured to allow the movable top panel portion to be slidably movable in relation to the fixed top panel portion in order to enlarge or contract the placing surface exposed by sliding the movable top panel portion, wherein:
- the fixed top panel portion is formed into a T shape in a top plan view,
- the movable top panel portion is formed into a U shape in the top plan view,
- the top panel takes a form of a substantially rectangular shape in the top plan view when mounting the cargo box,
- the fixed top panel portion comprises a crosswise extension part that extends in a vehicle width direction and a longitudinal extension part that extends rearward from the crosswise extension part,
- a pair of right and left front openings that are located immediately behind the crosswise extension part and that are formed in the base panel across the longitudinal extension part, and a rear opening that is formed of the base panel and the movable top panel portion, appear in the exposed part when the movable top panel portion is slid rearward, and
- the cargo box attachment part is formed of each of edges of the front openings and the rear opening.

10. The rear carrier for the saddle-ride vehicle according to claim 9, further comprising a cargo box, wherein:
- the cargo box has a pair of right and left front locking claws and a rear locking claw that are disposed in positions corresponding to the front openings and the rear opening,
- the front locking claws are operatively attached to a bottom part of the cargo box,
- the rear locking claw is formed to be movable according to a position of a lever,
- the rear locking claw is locked when the lever is stored, and
- the rear locking claw is unlocked when the lever is released.

11. The rear carrier for the saddle-ride vehicle according to claim 9, further comprising a cargo box, wherein:
- the cargo box is provided with a pair of right and left front locking claws and a rear locking claw that are provided in positions corresponding to the front openings and the rear opening,
- the front locking claws and the rear locking claw are operatively attached to a bottom part of the cargo box, and
- a locking member that is urged by an elastic member provided to the base panel is fitted into a recessed part formed in the movable top panel portion in such a manner that the movable top panel portion is moved to a backmost side, the front locking claws and the rear locking claw are inserted into the front openings and the rear opening, and after that, the movable top panel portion is moved forward.

12. The rear carrier for the saddle-ride vehicle according to claim 9, wherein the slide mechanism comprises at least one of a projecting rail, a recessed groove, or an oblong hole that is formed on the base panel, and is configured to be fitted into or around a recessed part or a projecting part that is formed on the movable top panel portion.

13. The rear carrier for the saddle-ride vehicle according to claim 12, wherein the slide mechanism is configured in such a manner that a projecting part, projecting from the movable top panel portion, is fitted into an oblong hole formed in the base panel, and a retention member is configured to prevent the projecting part from coming off from the oblong hole.

14. The rear carrier for the saddle-ride vehicle according to claim 9, wherein the fixed top panel portion is integrally formed with both or one of a rear grip provided to the vehicle and the base panel.

* * * * *